(12) United States Patent
Sakamoto et al.

(10) Patent No.: US 8,290,369 B2
(45) Date of Patent: Oct. 16, 2012

(54) OPTICAL ACCESS SYSTEM

(75) Inventors: Kenichi Sakamoto, Kokubunji (JP); Yoshihiro Ashi, Yokohama (JP); Tohru Kazawa, Kokubunji (JP); Ryosuke Nishino, Yokohama (JP); Masayuki Takase, Kokubunji (JP); Masahiko Mizutani, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/379,281

(22) Filed: Feb. 18, 2009

(65) Prior Publication Data

US 2009/0162055 A1    Jun. 25, 2009

Related U.S. Application Data

(63) Continuation of application No. 12/076,897, filed on Mar. 25, 2008, now Pat. No. 7,773,880, which is a continuation of application No. 11/346,467, filed on Feb. 3, 2006, now Pat. No. 7,369,768.

(30) Foreign Application Priority Data

Jul. 29, 2005  (JP) ................................ 2005-219907

(51) Int. Cl.
 *H04B 10/00* (2006.01)
(52) U.S. Cl. .................. 398/70; 398/58; 398/67; 398/71
(58) Field of Classification Search ............... 398/66–72
 See application file for complete search history.

(56) References Cited

U.S. PATENT DOCUMENTS

| | | | |
|---|---|---|---|
| 5,063,595 A | 11/1991 | Ballance | |
| 5,463,620 A * | 10/1995 | Sriram | 370/412 |
| 5,559,624 A | 9/1996 | Darcie et al. | |
| 5,912,998 A | 6/1999 | Quayle | |
| 6,592,272 B1 | 7/2003 | Masucci et al. | |
| 6,647,210 B1 | 11/2003 | Toyoda et al. | |

(Continued)

FOREIGN PATENT DOCUMENTS

JP    10-93607    9/1996

(Continued)

OTHER PUBLICATIONS

"A Broadband Optical Access System with Increased Service Capability Using Dynamic Bandwidth Assignment", Series G: Transmission Systems and Media, Digital Systems and Networks, International Telecommunication Union (Nov. 2001), 2 cover pages, pp. i-v, and 1-82.

(Continued)

*Primary Examiner* — Agustin Bello
(74) *Attorney, Agent, or Firm* — Crowell & Moring LLP

(57) ABSTRACT

An optical access system capable of avoiding cutoffs or interruption in the periodically transmitted signals that occur during the ranging time is provided. A first method to avoid signal cutoffs is to stop periodic transmit signals at the transmitter during the ranging period, and transmit all the periodic transmit signals together when the ranging ends, and buffer the signals at the receiver to prepare for ranging. A second method is to fix definite periods ahead of time for performing ranging, then cluster the multiple periodic transmit signals together in sets at the transmitter and send them, and then disassemble those sets back into signals at the receiver. The transmitting and receiving is then controlled so that the transmit periods do not overlap with the ranging periods. In this way an optical access system is provided that can send and receive signals requiring periodic transmissions without interruption even during ranging operation.

30 Claims, 17 Drawing Sheets

U.S. PATENT DOCUMENTS

| | | | |
|---|---|---|---|
| 6,650,839 B1 | 11/2003 | Mallard, Jr. et al. | |
| 6,697,374 B1 | 2/2004 | Marmur et al. | |
| 6,771,908 B2 | 8/2004 | Kim et al. | |
| 6,778,781 B2 | 8/2004 | Van Eijk et al. | |
| 6,799,267 B2 * | 9/2004 | Kojima et al. | 712/225 |
| 6,868,232 B2 | 3/2005 | Park et al. | |
| 7,190,858 B1 | 3/2007 | Greiner et al. | |
| 7,376,136 B2 * | 5/2008 | Song et al. | 370/392 |
| 7,424,229 B2 * | 9/2008 | Effenberger | 398/194 |
| 7,450,515 B2 * | 11/2008 | Song et al. | 370/236.2 |
| 7,535,930 B2 * | 5/2009 | Lim et al. | 370/474 |
| 2002/0085492 A1 * | 7/2002 | Mukai et al. | 370/230 |
| 2002/0159120 A1 | 10/2002 | Kitayama et al. | |
| 2003/0027585 A1 | 2/2003 | Ohnishi | |
| 2003/0091045 A1 * | 5/2003 | Choi et al. | 370/390 |
| 2003/0142626 A1 | 7/2003 | Umayabashi et al. | |
| 2004/0085905 A1 | 5/2004 | Lim et al. | |
| 2004/0090980 A1 | 5/2004 | Song et al. | |
| 2004/0202470 A1 | 10/2004 | Lim et al. | |
| 2004/0208631 A1 * | 10/2004 | Song et al. | 398/168 |
| 2004/0218534 A1 * | 11/2004 | Song et al. | 370/236.2 |
| 2005/0013314 A1 | 1/2005 | Lim et al. | |
| 2006/0140639 A1 * | 6/2006 | Effenberger | 398/159 |
| 2007/0025735 A1 | 2/2007 | Sakamoto et al. | |
| 2007/0109974 A1 * | 5/2007 | Cutillo et al. | 370/254 |
| 2007/0110053 A1 * | 5/2007 | Soni et al. | 370/389 |
| 2007/0274718 A1 * | 11/2007 | Bridges et al. | 398/63 |

FOREIGN PATENT DOCUMENTS

| | | |
|---|---|---|
| JP | 11-122279 | 10/1997 |
| JP | 11-146000 | 11/1997 |
| JP | 2002-198984 | 7/2002 |
| JP | 2003-244178 | 1/2003 |
| JP | 2005-33544 | 7/2003 |
| JP | 2003-224572 | 8/2003 |
| JP | 2003-283521 | 10/2003 |
| JP | 2003-318846 | 11/2003 |
| JP | 2005-033544 | 2/2005 |
| WO | WO 96/13915 | 5/1996 |

OTHER PUBLICATIONS

"Draft Amendment to Carrier Sense Multiple Access with Collision Detection (CSMA/CD) Access Method and Physical Layer Specifications", IEEE Draft P802.3ah ™/D3.3 (2002), pp. i-viii, and 469-525.

"Gigabit-Capable Passive Optical Networks (GPON): General Characteristics", Series G: Transmission Systems and Media, Digital Systems and Networks, International Telecommunication Union (Mar. 2003), 2 cover pages, pp. i-iii, and 1-14.

"Gigabit-Capable Passive Optical Networks (GPON): ONT Management and Control Interface Specification", Series G: Transmission Systems and Media, Digital Systems and Networks, International Telecommunication Union (Jun. 2004), 2 cover pages, pp. 1-110.

Japanese Office Action dated Jun. 10, 2008 regarding Japanese Application No. 2006-274608 in Japanese.

"Implementor's Guide for Recommendation G.983.1 B-PON", Internal ITU-T Document, pp. 1-6.

* cited by examiner

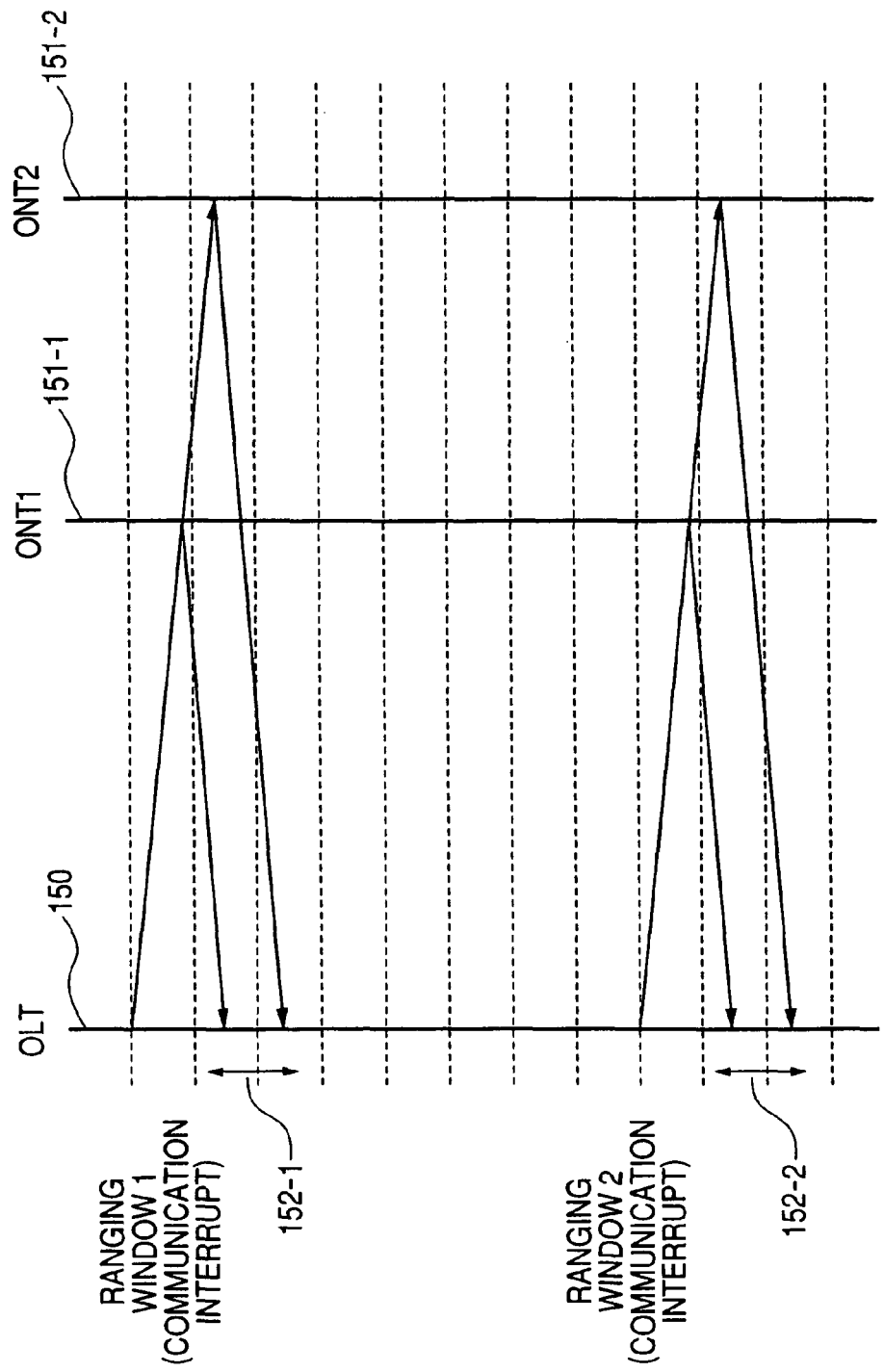

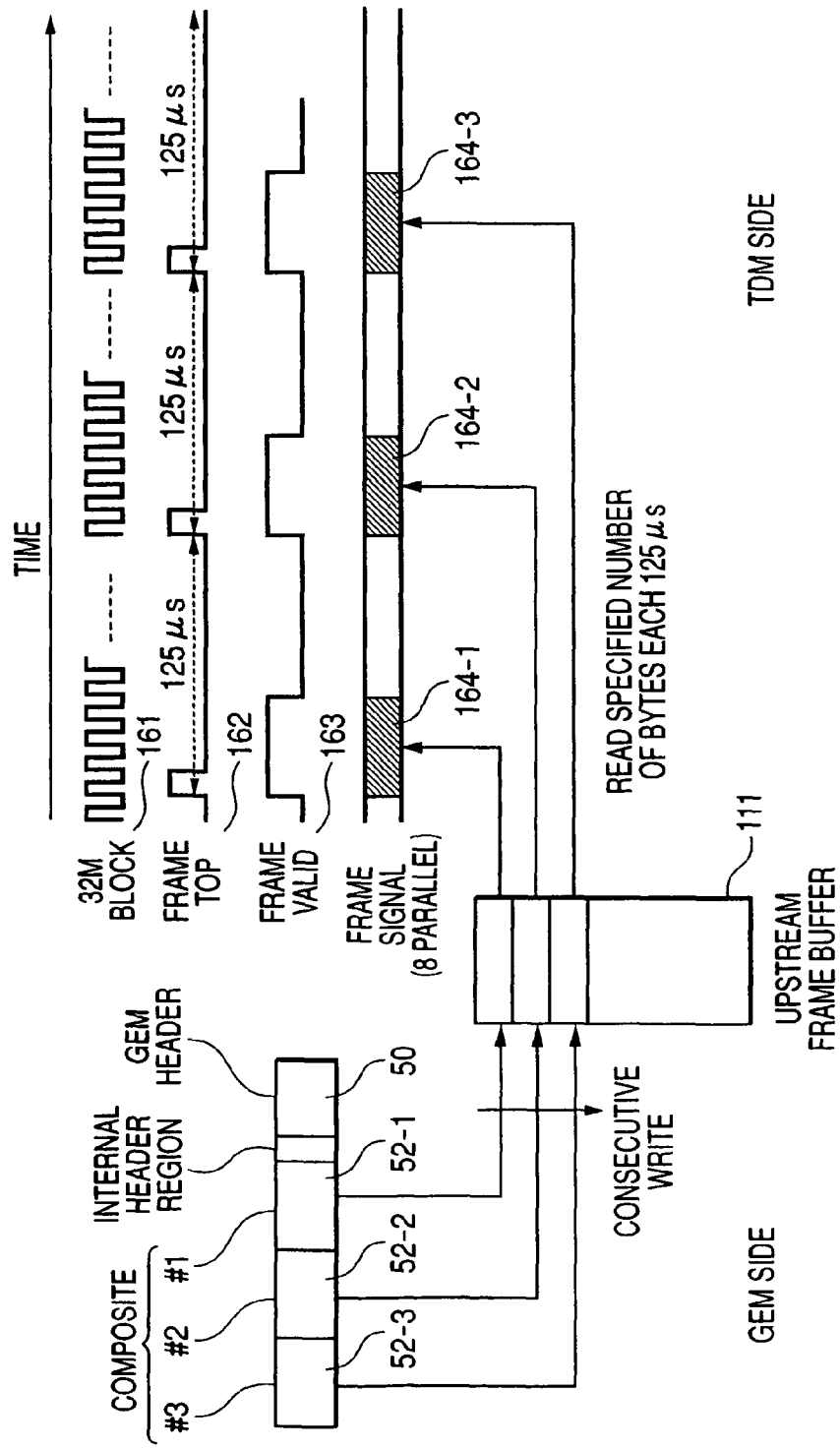

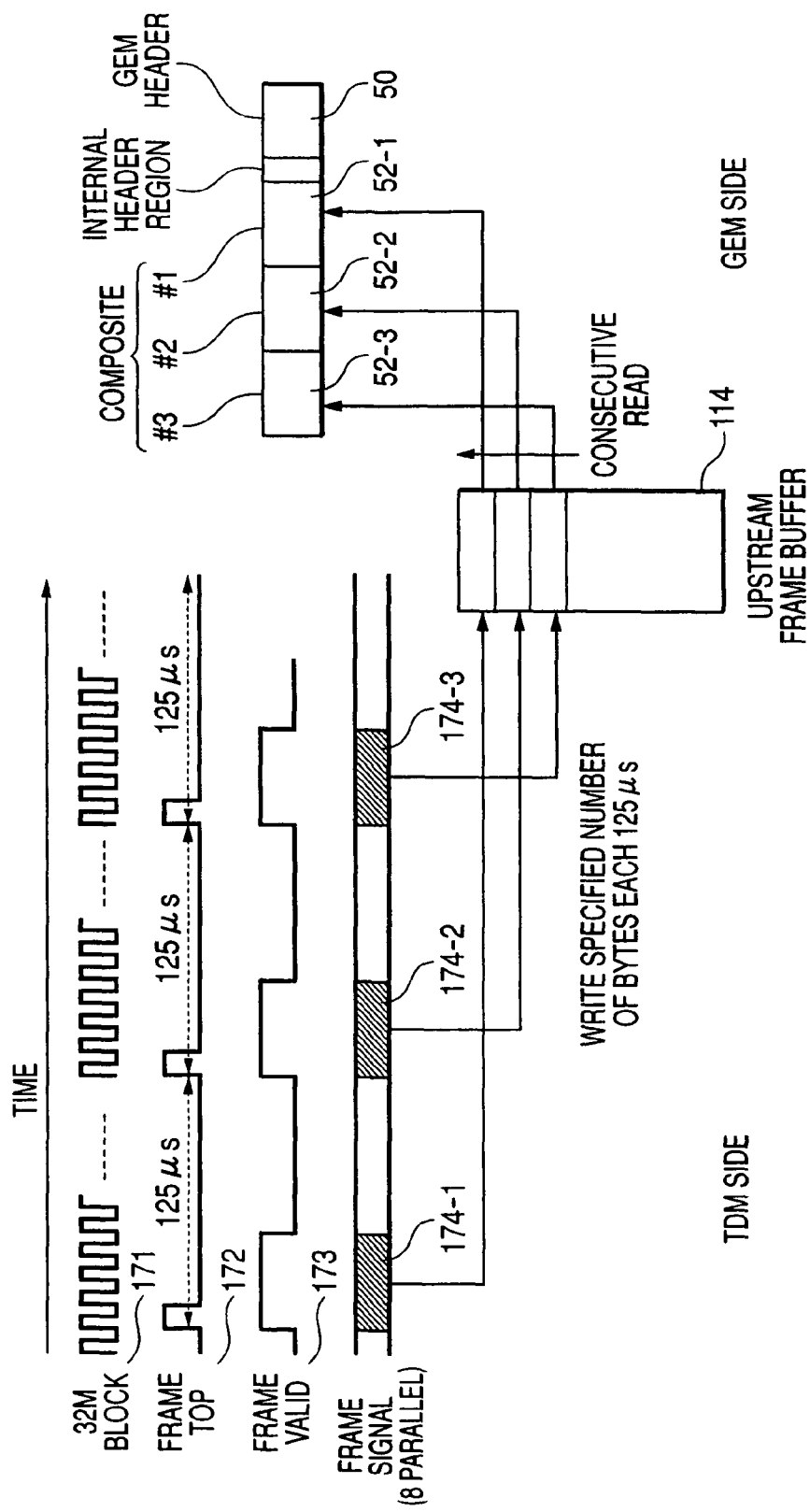

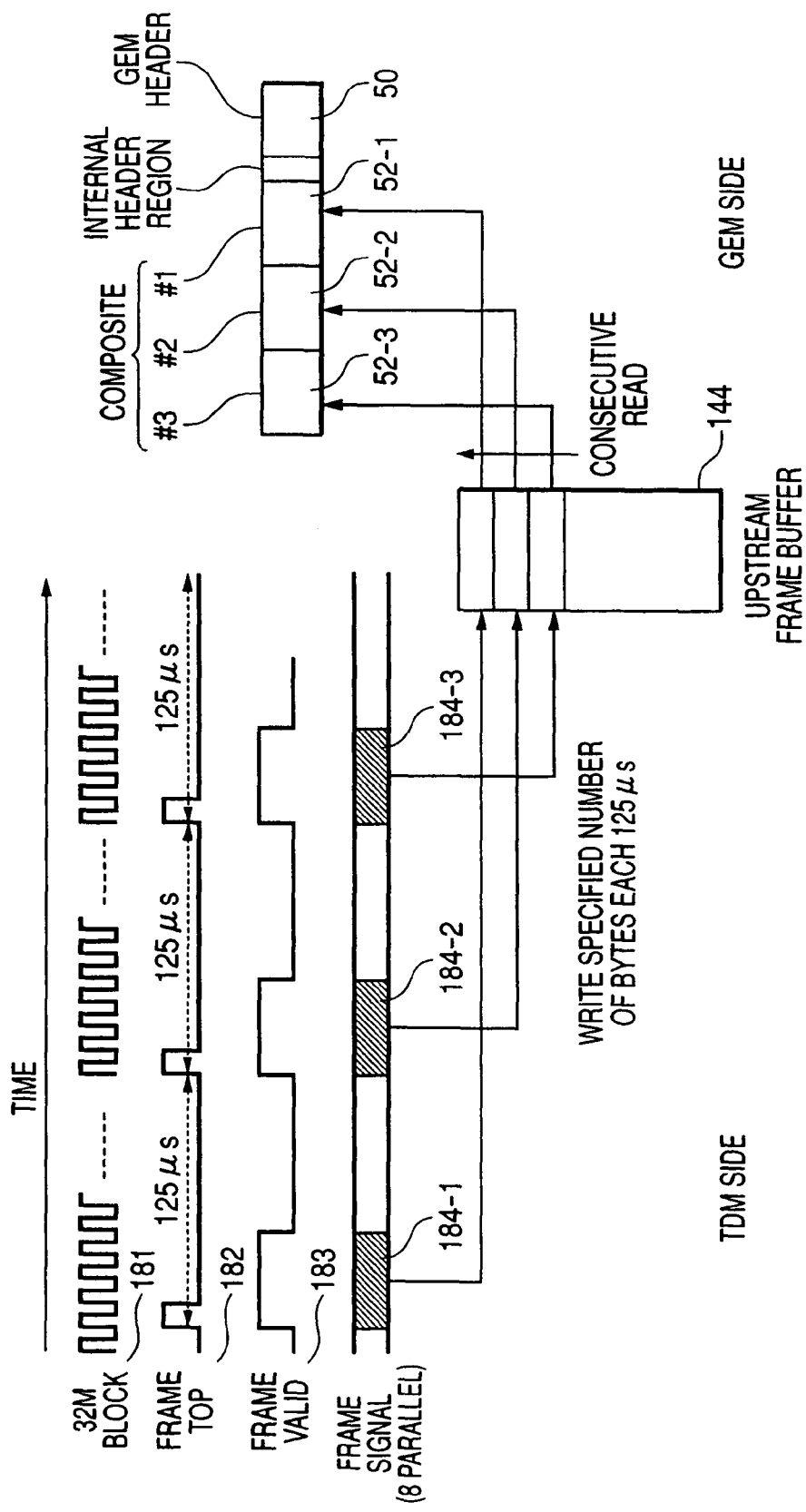

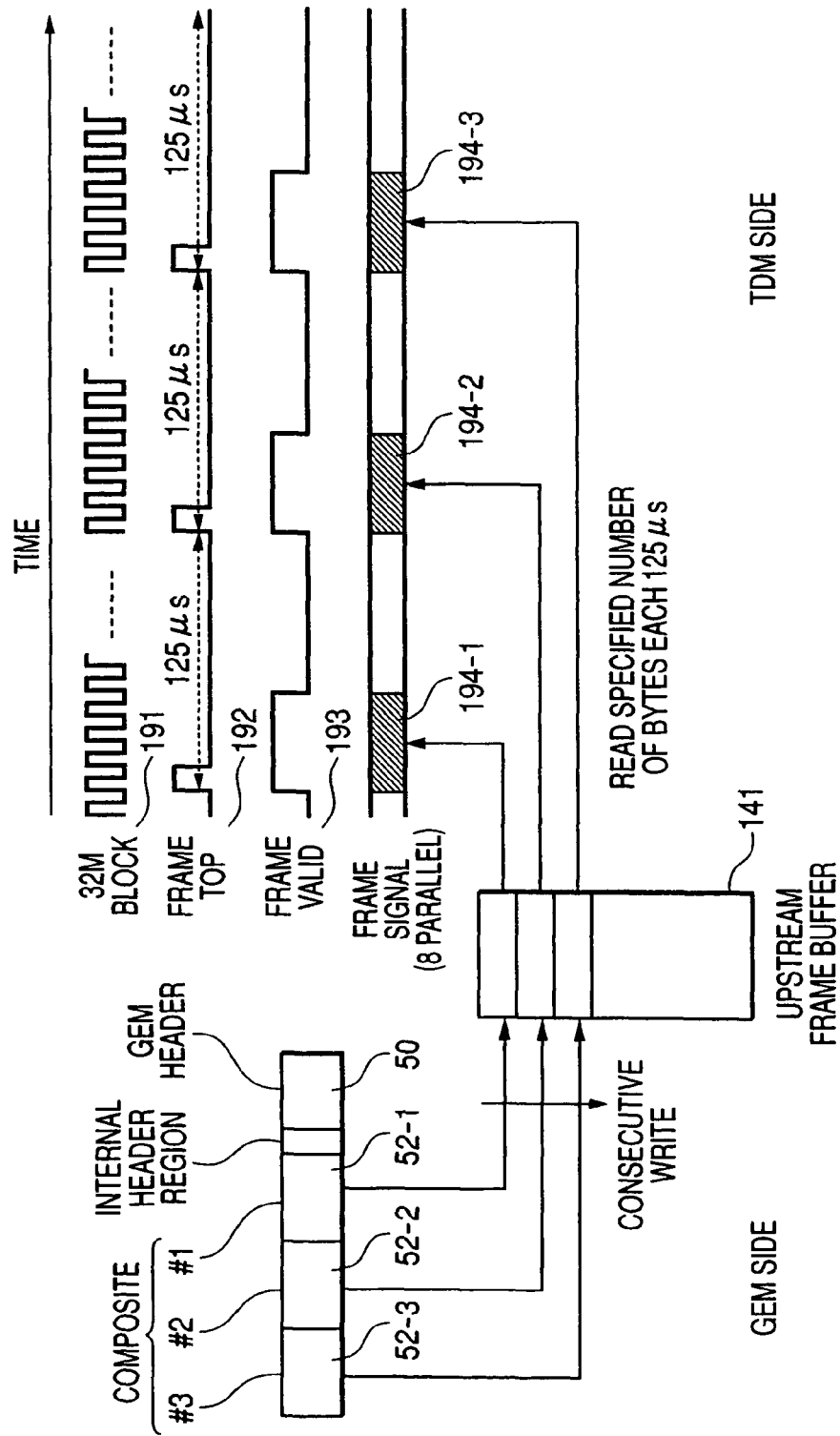

OPTICAL ACCESS SYSTEM

CROSS REFERENCE TO RELATED APPLICATIONS

This application is a Continuation application of U.S. application Ser. No. 12/076,897 filed Mar. 25, 2008, which is a Continuation application of U.S. application Ser. No. 11/346,467 filed Feb. 3, 2006 now U.S. Pat. No. 7,369,768. Priority is claimed based upon U.S. application Ser. No. 12/076,897 filed Mar. 25, 2008, which claims the priority of U.S. application Ser. No. 11/346,467 filed Feb. 3, 2006, which claims the priority date of Japanese Application No. 2005-219907 filed on Jul. 29, 2005, and which is hereby incorporated by reference.

FIELD OF THE INVENTION

The present invention relates to an optical access system for communication between a subscriber residence and a communication provider station.

BACKGROUND OF THE INVENTION

Telephone subscriber networks and ADSL have been utilized in access networks for storing user stations in public communications networks for forwarding data such as audio or video. Moreover optical access systems have become more widespread in recent years.

These optical access systems use a method for connecting the station and the subscriber in a one-to-one relationship, and a method for connecting in a one-to-x relationship. The PON (Passive Optical Network) method is known as one-to-x connection method.

In the PON method, data communication is performed by sharing bandwidth between an OLT (Optical Line Terminal) and multiple ONT (Optical Network Terminal) by assigning one upstream and one downstream optical wavelength. In communication between the ONT and OLT, the downstream optical signal from the OLT heading towards the ONT is divided by a splitter, and the signal just for that particular ONT is extracted. In communication with the upstream signal, the OLT notifies the ONT of the transmission timing, and the ONT then transmits the signal to the OLT at that timing so that communication between the OLT and multiple ONT jointly on one wavelength.

Optical access methods of this type include: B-PON (Broadband PON) (See ITU-T Recommendation G.983.1, G.983.4), GE-PON (Giga-bit Ethernet PON) (See IEEE IEEE802.3ah), and G-PON (Generic PON) (See ITU-T Recommendation G.984.1, G.984.4) systems.

Signals communicated through PON systems are non-periodic signals such as webs and mail traffic over internet and periodic type signals conveyed by conventional telephone systems and leased line networks. The latter or periodic type signals (TDM: Time Division Multiplexing) have a fixed period (short-period frame) of 125 μs, and the signal is sent at a fixed bandwidth by transmitting a fixed amount of bytes within this fixed period. The signal must be sent each 125 μs period and no timing jitter is allowed.

SUMMARY OF THE INVENTION

In the PON system however, the distance between the ONT and OLT is not always a fixed distance. So the distance between the ONT and OLT must be measured periodically and the transmit timing of the ONT upstream signal must be corrected (This measurement and correction operation is called ranging.). When the distances between the OLT and ONT for example are distributed between 20 to 40 kilometers, the maximum allowable distance differential is 20 kilometers. To measure the distance of OLT and ONUs, the time of ranging (a ranging window) is up to 250 μs.

During the time of this measurement, only the frames for ranging are transmitted, then user's communications must be stopped during this time.

As described above, the periodic signal such as TDM signals required for a signal transmission at each 125 μs. The problem is that the ranging is performed and user signal is stopped for 250 μs, periodic signal communication becomes impossible and the signal is lost.

In a first aspect of this invention to resolve the above problems, the transmit signals are buffered (temporarily stored) at the transmitter during the ranging time and the signals then sent together when the ranging ends. Since some signals might not arrive during the ranging time, while no ranging is taking place, the receiver buffers ahead of time those TDM signals that are sent during the ranging time, and then transmits these buffered signals so that no interruption in communications will occur.

In a second aspect of this invention to resolve the above problems, long-period frames that are X-number of times larger than the short-period frames are utilized, and the ranging timing fixed at a specified position on the long-period frame. The communication signals are then clustered into multiple short-period frames ahead of time at the transmitter, assembled as composite frames and transmitted. These composite frames are then disassembled at the receiver, attached to a 125 μs signal and transmitted towards the next communications device. Communication interruptions can then in this way be avoided by scheduling the transmission timing of these composite frames so as not to conflict with the ranging timing.

This invention can therefore provide an optical access system capable of transmitting signals requiring periodic transmission without interruptions in communication even during the ranging operation.

BRIEF DESCRIPTION OF THE DRAWINGS

FIG. 13 is a drawing for describing the ranging method;

FIG. 14 is a block diagram of the signal processing in the upstream TDM GEM terminator device for the OLT of this invention;

FIG. 15 is a block diagram of the signal processing in the downstream TDM GEM terminator device for the OLT of this invention;

FIG. 16 is a block diagram of the signal processing in the upstream TDM GEM terminator device for the ONT of this invention; and FIG. 17 is a block diagram of the signal processing in the downstream TDM GEM terminator device for the ONT of this invention.

DETAILED DESCRIPTION OF THE PREFERRED EMBODIMENTS

Figure 1:
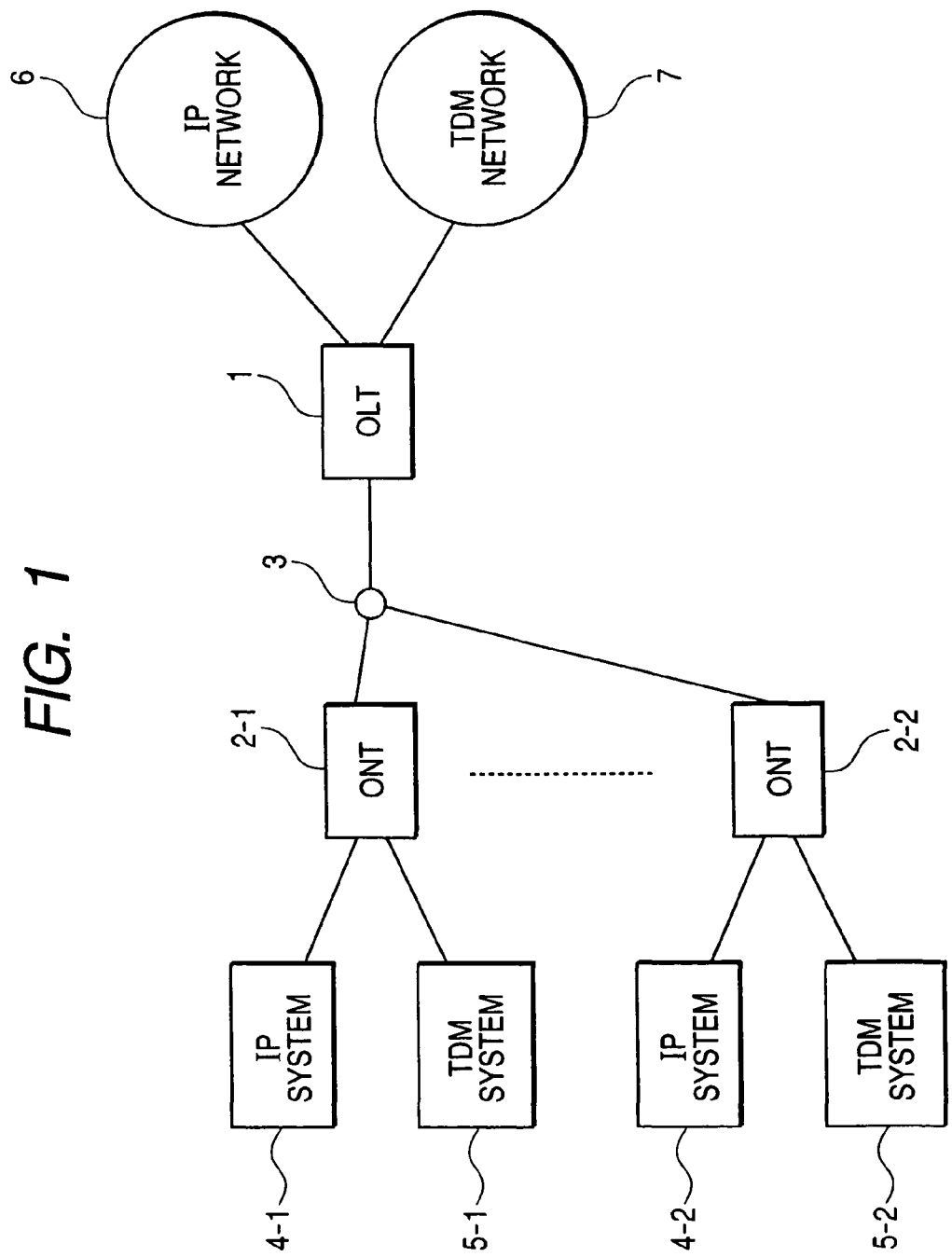
FIG. 1 is a drawing of the embodiment of the optical access network system of this invention.

FIG. 1 is a drawing showing the first embodiment of the optical access network system of this invention. The optical access network system is configured between the OLT-1 and the ONT 2-1, ONT 2-2. The OLT connects to each ONT via a splitter 3. At least one among the ONT 2 is connected to the IP system 4 and the TDM system 5. The OLT connects to the IP network 6 and the TDM network 7. TDM signals from the TDM system 5 are stored into the TDM network 7 via the optical network. Signals from the IP system 4 are stored in the IP network 6 via the optical network.

The ranging is described next using FIG. 13. Ranging is a process for measuring the distance between the OLT and ONT in order to correct the phase of the upstream signal. Ranging starts from the OLT and is performed by immediately returning the signal at each ONT. The ranging window 152 is the time in which ranging is performed and during this time, communication interruptions occur. In this invention, time-division multiplex signals can still be sent and received even during the communication interruption time that is characteristic of optical access systems.

Figure 2:
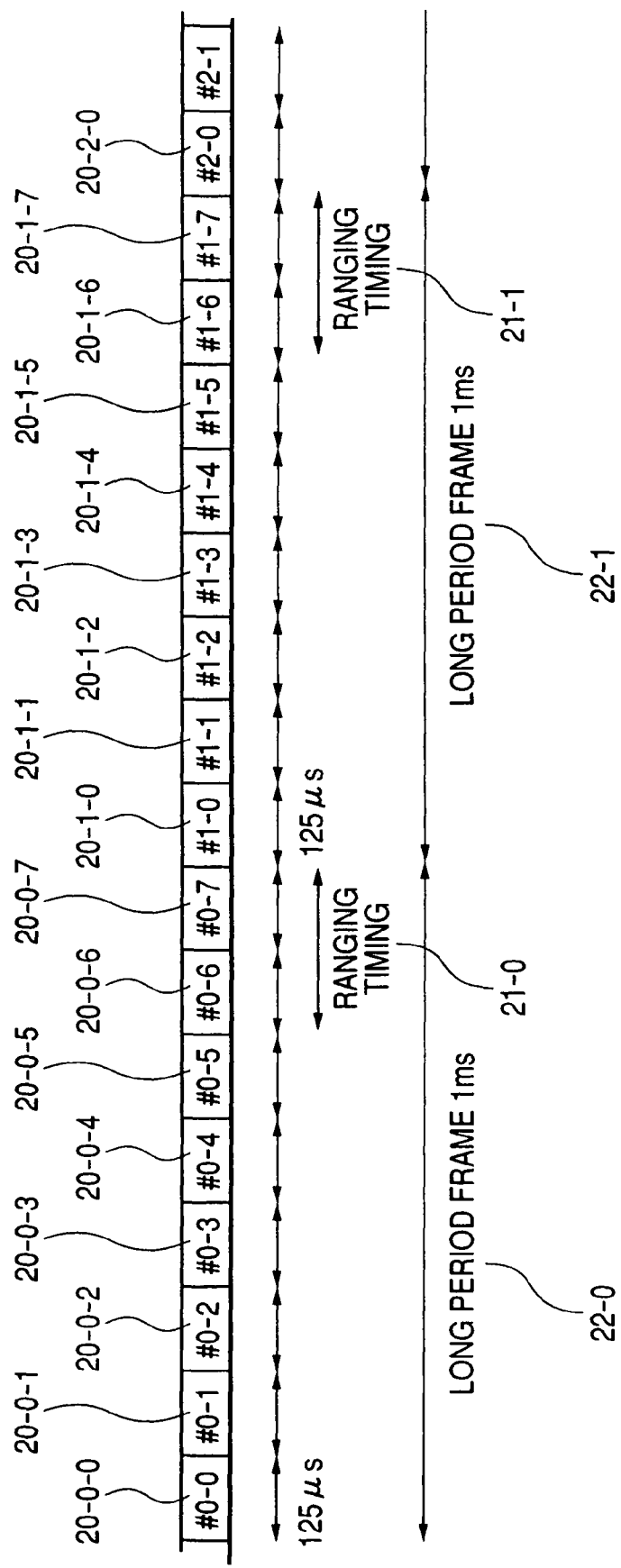
FIG. 2 is an example of the frame timing of this invention.

FIG. 2 is an example of the transmission frame timing in the optical access system of this invention. Short-period frames each 125 μs long are utilized for communication between the OLT 1 and ONT 2. Communication is performed multiplexing multiple packets called GEM within these short-period frames 20. This embodiment utilizes a 1 ms long-period frame 22 of multiple frames, and a range timing 21 is fixed to the frame 22. Here, the term "fixed" indicates performing ranging at a fixed timing on the long-period frame period. In this example, the long-period frame is eight times longer than the short-period frame, and the range timing is fixed to No. 6 20-0-6 and No. 7 20-0-7 within this long-period frame. By fixing the range timing 21 to the long-period frame 22, it is possible to predict when the communications will be cut off (interrupted).

Figure 3:
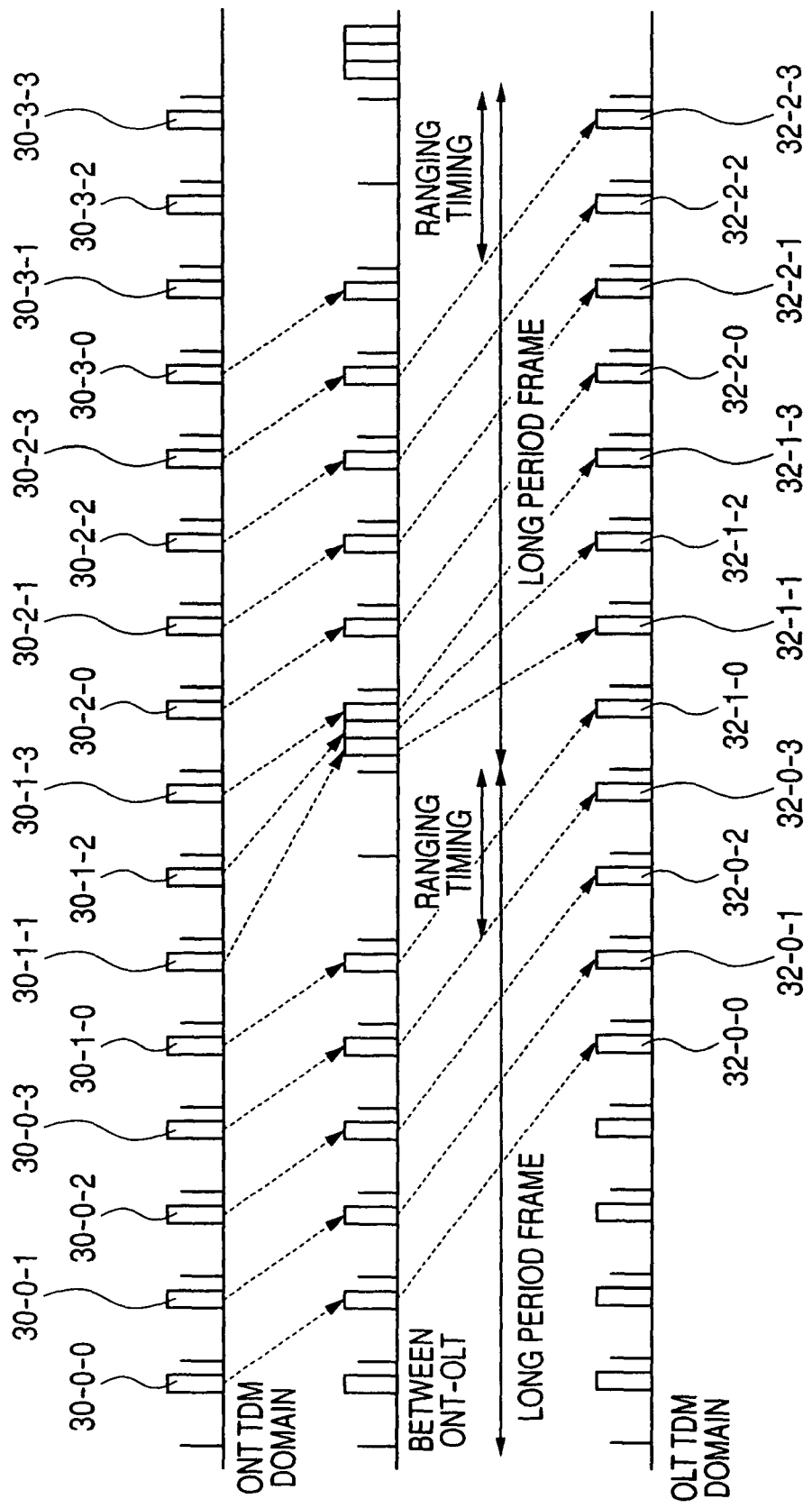
FIG. 3 is one example of the signal transmit/receive timing of this invention.

FIG. 3 is one example of the signal transmit frame timing in the optical access system of this invention. In this example, the communication is cut off during the range timing so that a two frame portion of the TDM signal is buffered in advance on the receive side device (OLT in the case of this figure) to prepare for ranging, and the communication interruption is avoided by sending the TDM signal from the buffer within that range timing.

Figure 4:
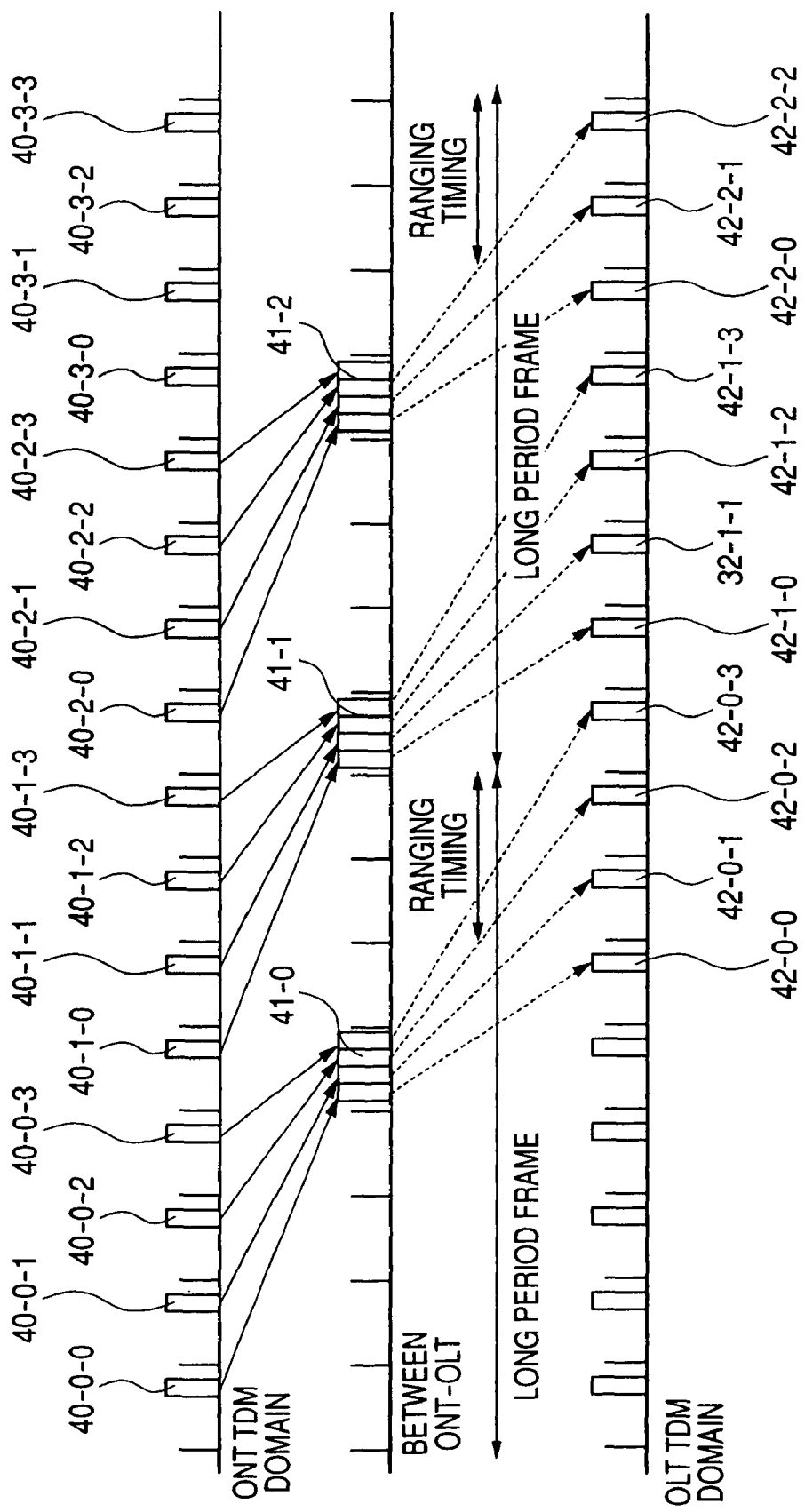
FIG. 4 is one example of the signal transmit/receive timing of this invention.

FIG. 4 is one example of the signal transmit/receive frame timing of the optical access system of this invention. The composite method is used in this example. The composite method is a method in which a TDM signal made up of a fixed number of x frames are constantly buffered on the transmit side device, and sent together as GEM. In this figure, ONT is the transmit side device, and OLT 1 is the receive side device. The TDM signals 40 arrive periodically at the ONT 2. The ONT 2 buffers and then clusters these signals side-by-side in groups of four each, and consistently transmits them in groups of four as a GEM in the same short-period frame towards the OLT 1. The OLT 1 disassembles this GEM and transmits each short-period frame as a TDM signal. In this example, the 1 ms long-period frame is a group of four frames so if composite packets 41 are transmitted in the first and fifth or the second and sixth short-period frames inside the long-period frame, then the composite packets 41 can be transmitted while avoiding the ranging timing fixed at the seventh and eighth (short-period frames) so that communication interruptions can be avoided.

Figure 5:
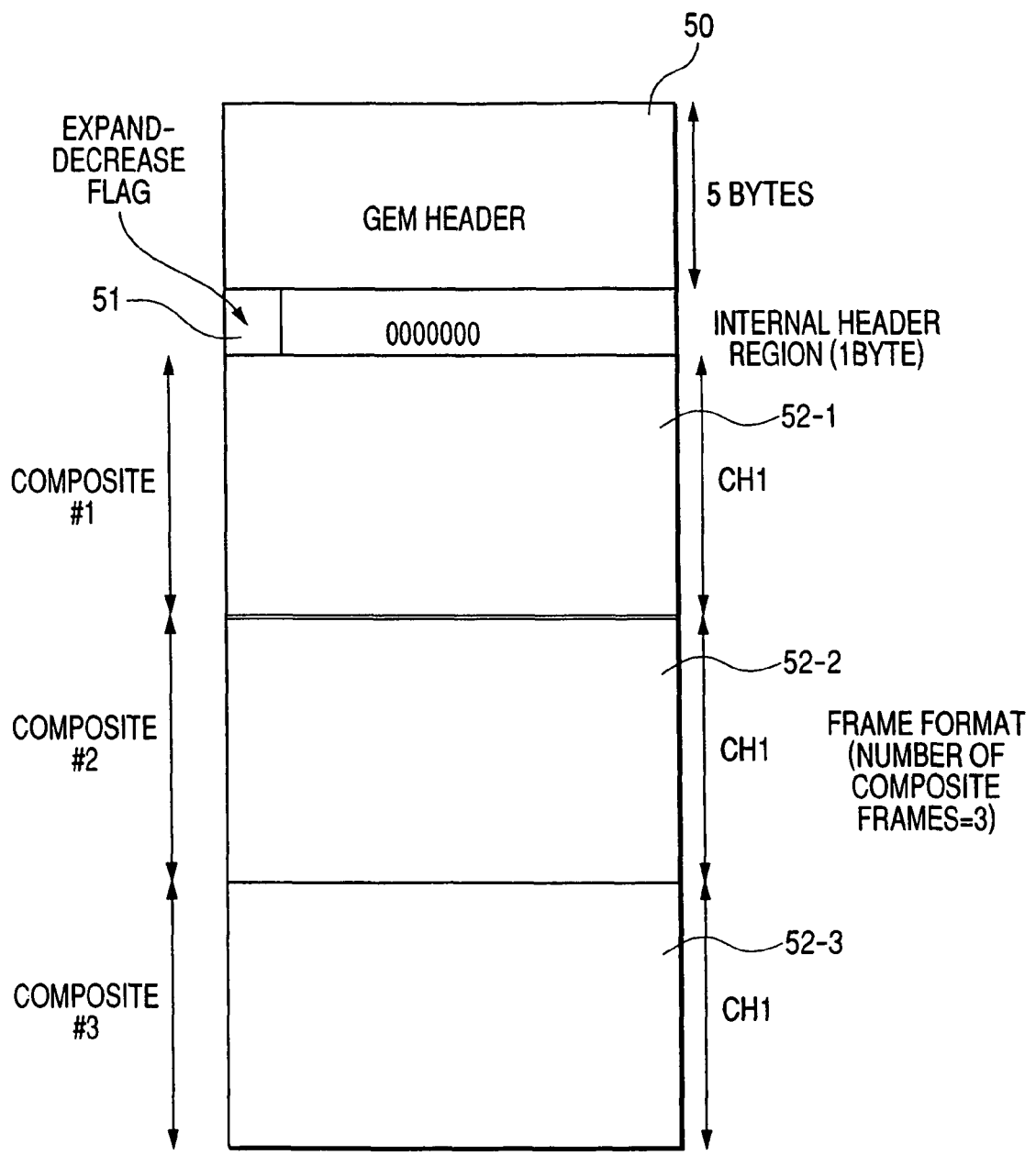
FIG. 5 is an example of the transmit/receive packet format of this invention.

FIG. 5 is an example of the composite packet of this invention. This drawing shows the case where the composites are equivalent to three time slots. The composite TDM signals 52 are multiplexed to the rear of the GEM header 50. An expand-decrease flag 51 is a field for communicating information relating to expansion or reduction. This expand-decrease flag 51 is sometimes utilized for expanding or reducing the number of TDM channels for the applicable ONT 2.

Figure 6:
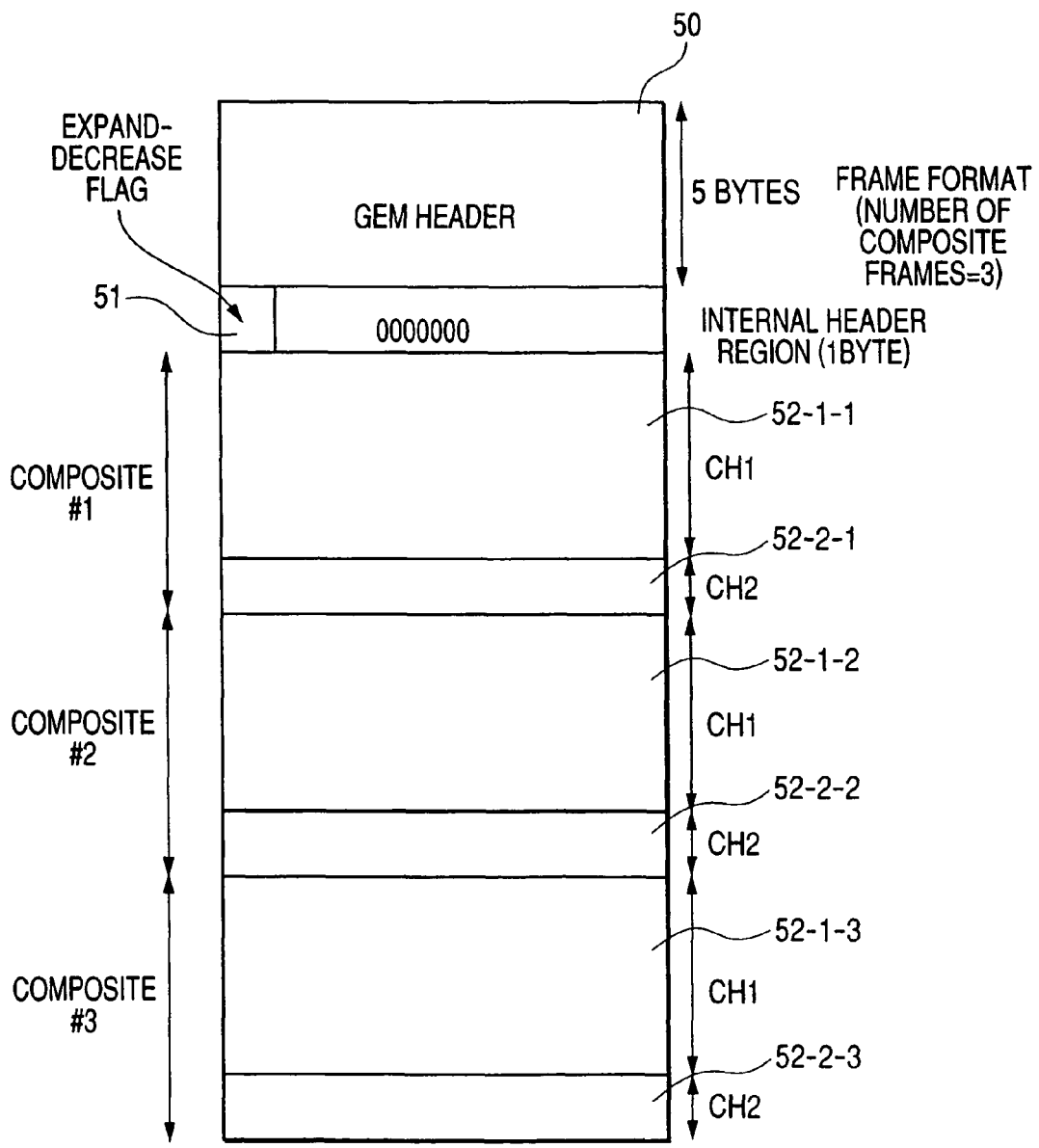
FIG. 6 is an example of the transmit/receive packet format of this invention.

FIG. 6 is an example of a composite packet. This drawing shows the case where the composites are equivalent to three time slots. This drawing also shows the case in which two TDM channels are assigned to the applicable ONT 2. Signals for CH1 52-1 and CH2 52-2 are alternately loaded in three frames in the same GEM. The expand-decrease flag 51 is a field for communicating information relating to expansion or reduction. This expand-decrease flag 51 is sometimes utilized for expanding or reducing the number of TDM channels for the applicable ONT 2.

Figure 7:
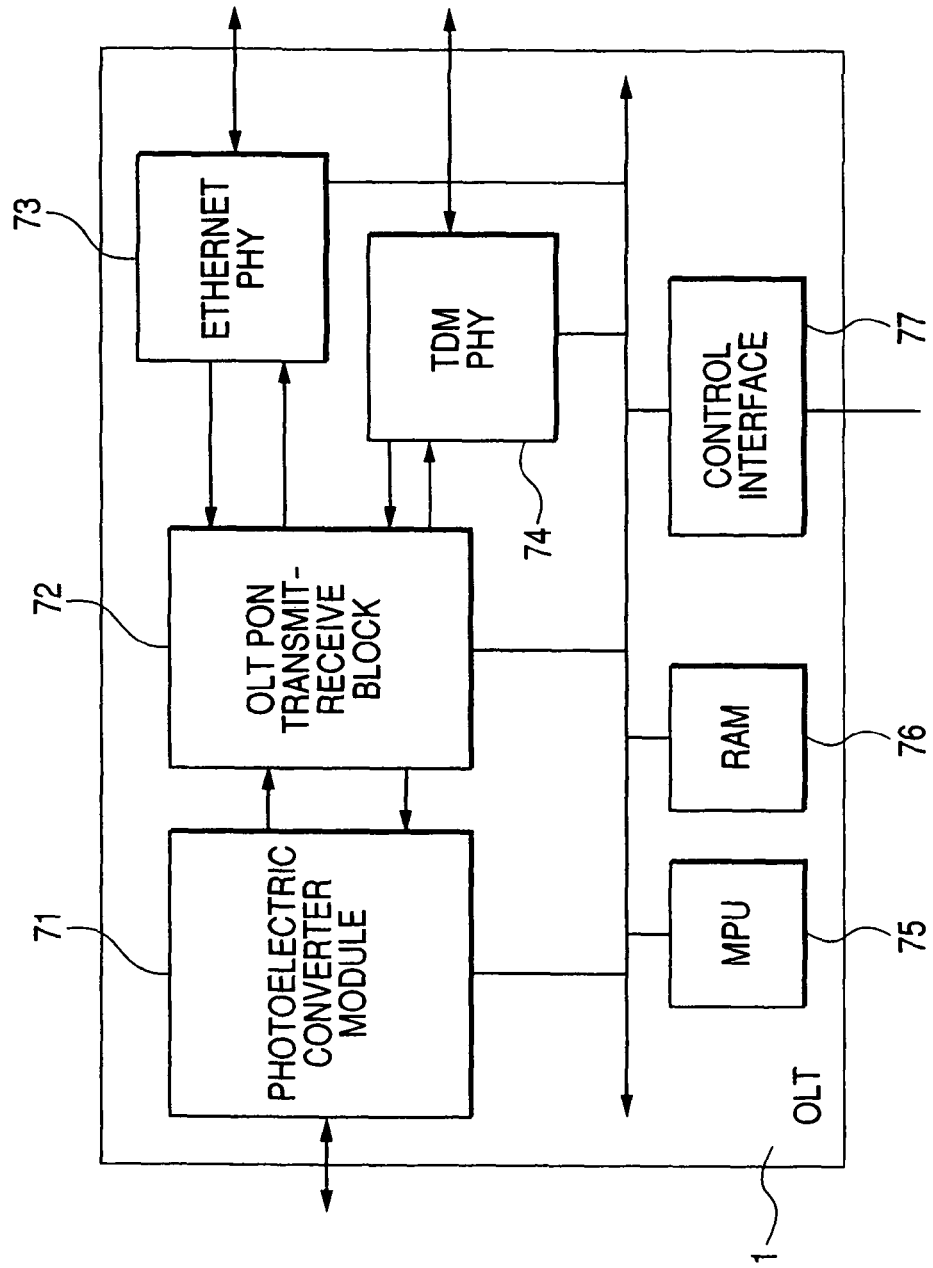
FIG. 7 is an example of the optical line terminal (OLT) of this invention.

FIG. 7 is a block diagram showing the structure of the OLT 1 in this invention. Upstream signals arriving from the optical access network are converted to electrical signals in the photoelectric converter module 71, and next GEM-terminated in the OLT PON transmit/receiver block 72, then converted to Ethernet frames and TDM signals, and sent respectively to the Ethernet PHY 73 and the TDM PHY 74, and transmitted to the IP network 6 and the TDM signal network 7. Downstream signals arriving from the Ethernet PHY 73 and the TDM PHY 74 are first respectively received at the Ethernet PHY 73 and TDM PHY 74, and next assembled into GEM frames in the OLT PON transmit/receiver block 72, and then transmitted via the photoelectric converter module 71 to the optical network 7. An MPU 75 and RAM 76, and control interface 77 are a microcomputer for controlling the OLT, a RAM, and a setup interface for making external settings to the OLT.

Figure 8:
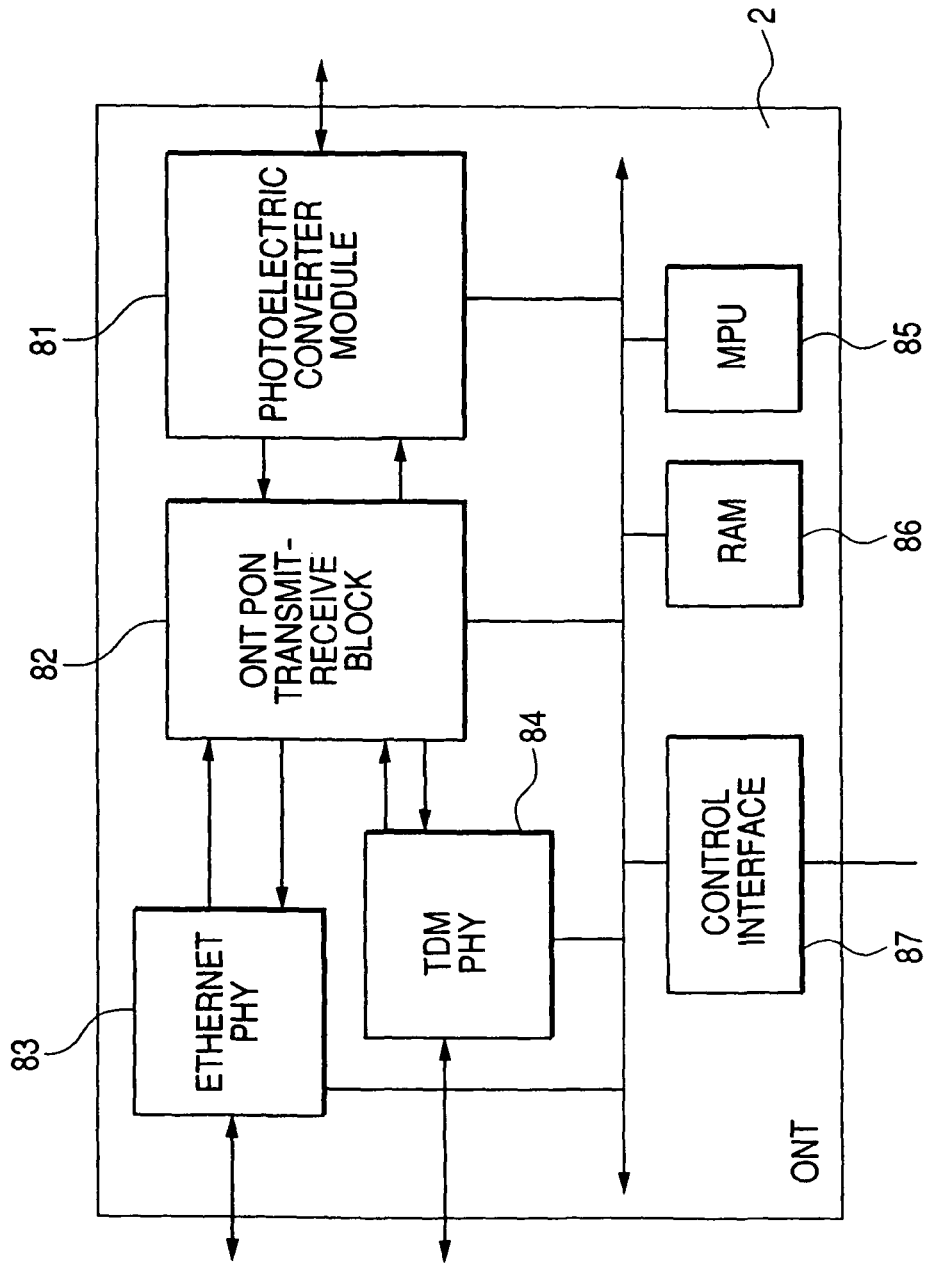
FIG. 8 is an example of the subscriber optical network terminal (ONT) of this invention.

FIG. 8 is a block diagram showing the structure of the ONT 1 of this invention. Downstream signals arriving from the optical access network are converted into electrical signals by the photoelectric converter module 81, GEM-terminated by the ONT PON transmit/receiver block 82, then converted to Ethernet frames and TDM signals, and sent respectively to the Ethernet PHY 83 and the TDM PHY 84, and transmitted to the IP system 4 and the TDM system 5. After the upstream signals arriving from the IP system 4 and the TDM system 5 are received respectively at the Ethernet PHY 83 and the TDM PHY 84, they are assembled into GEM frames in the ONT PON transmit/receiver block 82, and then transmitted via the photoelectric converter module 81 to the optical network 7. An MPU 85 and RAM 86 and control interface 87 are a microcomputer for controlling the ONT, a RAM, and a setup interface for making external settings to the ONT.

Figure 9:
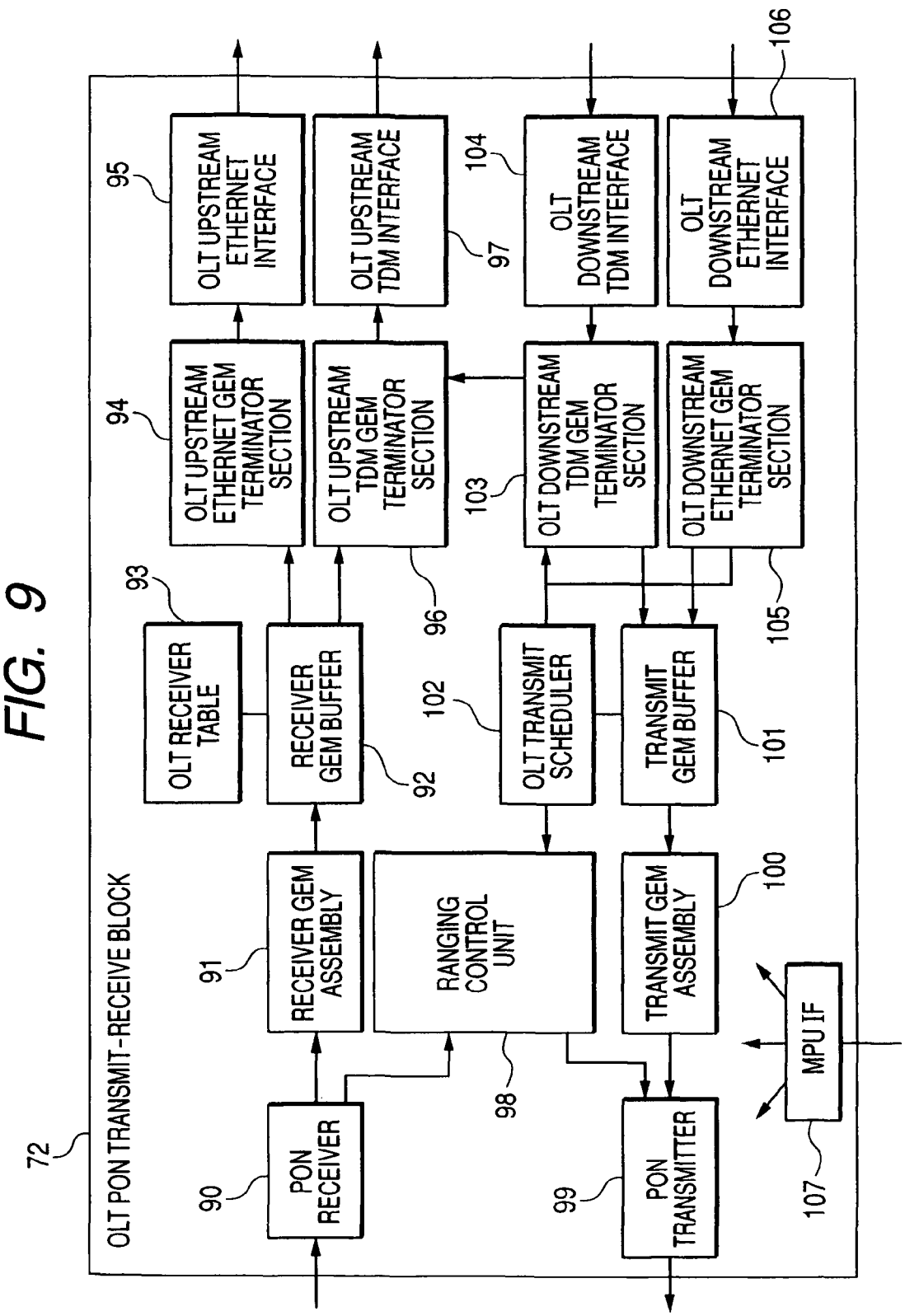
FIG. 9 is an example of the PON transmit/receive block for the OLT of this invention.

FIG. 9 is a block diagram showing in detail the structure of the OLT PON transmit/receiver block 72. The upstream signals from the photoelectric converter module 71 arrive at the PON receiver 90. Here, after synchronizing and GEM extraction are performed, the signals divided into multiple transmitted short-period frames are GEM assembled in the receiver GEM assembly 91. After then storing them in the receiver GEM buffer 92, they are assigned to the OLT upstream Ethernet GEM terminator section 94 and the OLT upstream TDM GEM terminator section 96 according to table information in the OLT receive table 93. The Ethernet frames are transmitted via the OLT upstream Ethernet interface 95 to the Ethernet PHY 73. The TDM signals are extracted from (TDM) composite packets by the OLT upstream TDM GEM terminator section 96, and sent at the desired timing via the OLT upstream TDM interface 97, to the TDM PHY 84.

The downstream signals are received as TDM signals from the OLT downstream TDM interface 104, and the OLT downstream TDM GEM terminator section 103 buffers (temporarily stores) the TDM signals and assembles them into composite frames. The Ethernet frames are received from the OLT downstream Ethernet interface 106, and the OLT downstream Ethernet GEM terminator section 105 then generates the GEM. The OLT downstream Ethernet GEM terminator section 105 then periodically loads the (TDM) composite GEM from the OLT downstream TDM GEM terminator section 103, at the available timing according to instructions from the OLT transmit scheduler 102. After the transmit GEM assembly 100 generates headers via the transmit GEM buffer 101, the PON transmitter 99 transmits the GEM frames. When performing ranging, the ranging control unit 98 starts ranging with a ranging signal at the timing allowed by the OLT transmit scheduler 102, and the PON transmitter 99 sends the ranging signals. A reply from ONT 2 then returns to the ranging control unit 98 via the PON receiver 90 to complete the ranging.

Figure 10:
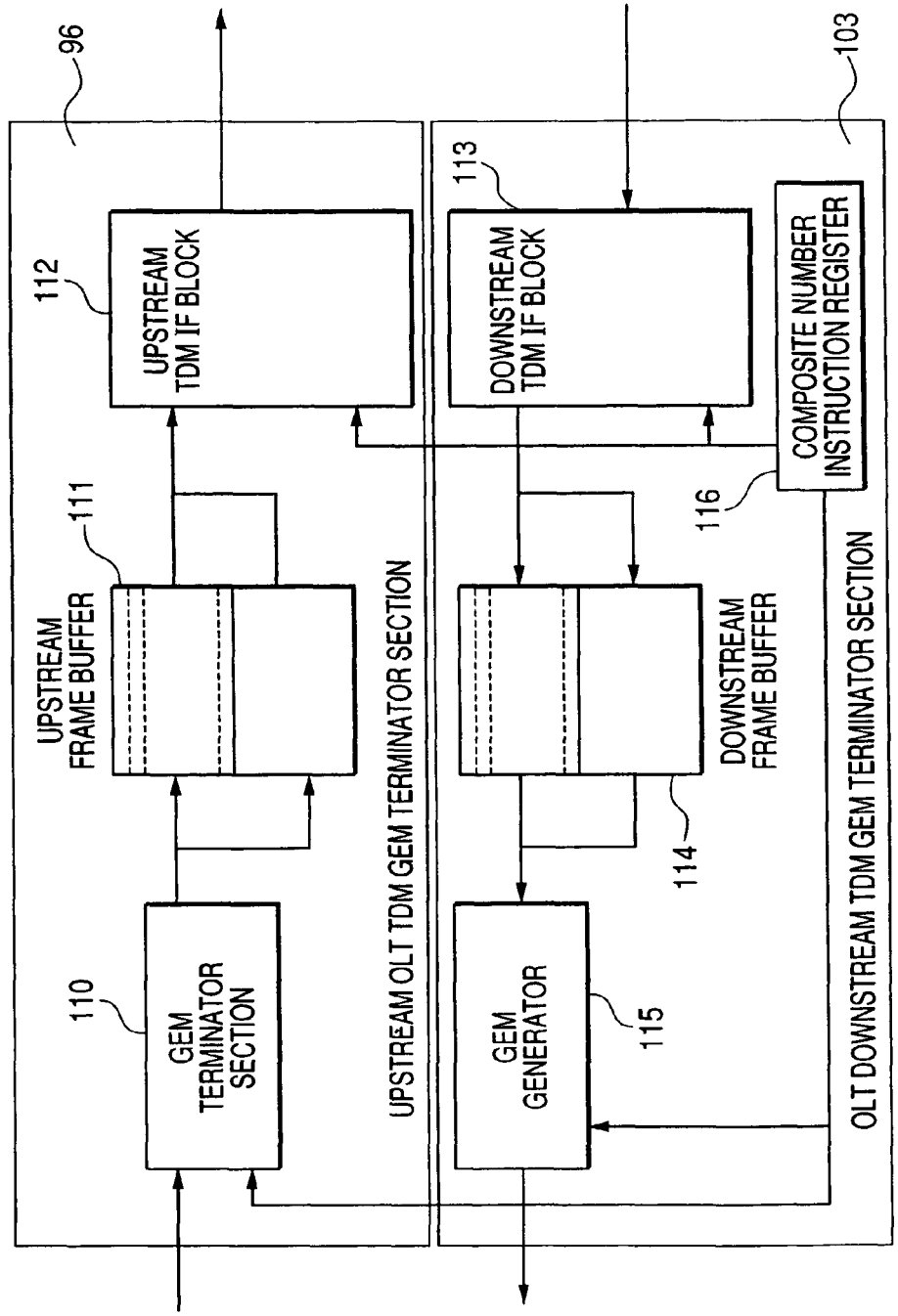
FIG. 10 is an example of the TDM GEM terminator devices for the OLT of this invention.

FIG. 10 is a block diagram showing the structure of the OLT upstream TDM GEM terminator section 96 and the OLT downstream TDM GEM terminator section 103. After the GEM terminator section 110 deletes the GEM headers of upstream receiver GEM holding the TDM signals, a payload section is written on the upstream frame buffer 111. The upstream TDM IF block 112 reads out (or loads) the TDM signals according to values in the composite number instruction register 116 and transmits them every 125 μs. These TDM signals headed downstream arrive at the downstream TDM IF block 113 every 125 μs, and those signals are then written in the downstream frame buffer 114. The storage position in the memory is at this time set according to the value in the composite number instruction register 116. The GEM generator 115 assembles the specified number of composite frames according to values in the composite number instruction register 116, attaches a GEM header and transmits the frames.

FIG. 14 is a drawing showing the method for disassembling GEM frames and generating TDM frames in the OLT upstream TDM GEM terminator section 96. After receiving the composite GEM frames (of TDM signals), the OLT upstream TDM GEM terminator section 96 deletes the GEM header 50 and internal header region, and consecutively writes the payload 52 for the composite frame in fields on the upstream frame buffer 111. The upstream TDM IF block 112 generates 125 μs period frames 162 at the clock 161 (32 MHz in this example), and the arriving composite TDM signals respectively mapped as 164-1 through 3 and transmitted at 125 μs period each. The frame valid signal 163 flows in parallel with the frame at this time and indicates whether the TDM signal is valid or invalid. The TDM PHY 74 receives this signal, and a TDM signal is sent here by mapping in SDH frames.

FIG. 15 is a drawing showing the method for receiving TDM frames and generating GEM frames in the OLT downstream TDM GEM terminator section 103.

The mapped signal comprised of SDH frames received at the TDM PHY 74 is converted here to a signal flowing in parallel with a clock signal 171, a frame top signal 172, and a frame valid signal 173 and these signals are input to the OLT downstream TDM GEM terminator section 103. These signals arriving every 125 μs are each written in a specified number of bytes on a specified region of the downstream frame buffer 114. When the writing ends and the GEM generator 115 finishes generating the internal header region and GEM headers, the signals are loaded (read-out) as a consecutive number of composites from the upstream frame buffer 114, and GEM frames are generated. These frames are sent to the transmit GEM buffer and transmitted to the PON domain.

Figure 11:
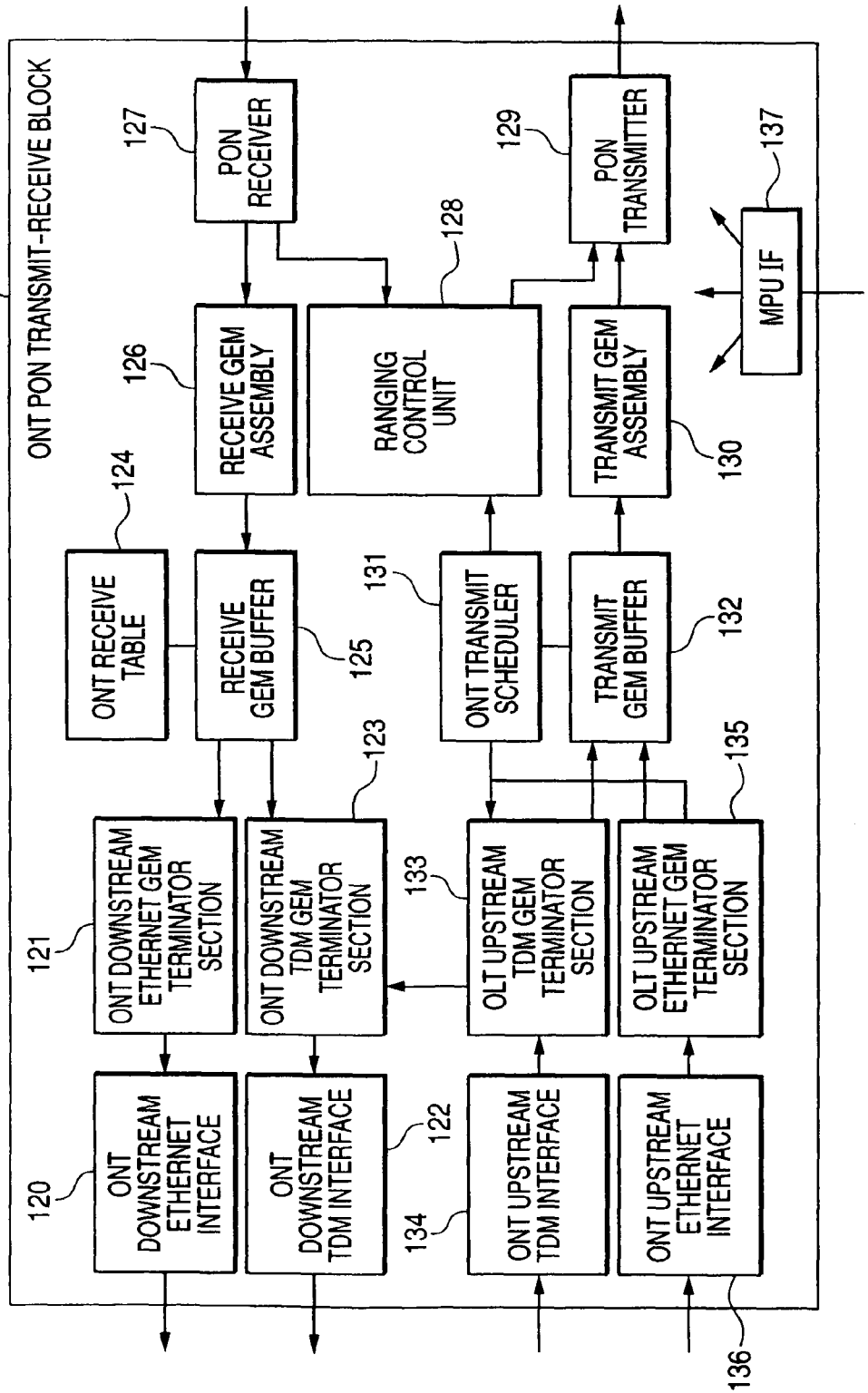
FIG. 11 is an example of the PON transmit/receive block for the ONT of this invention.

FIG. 11 is a block diagram showing the ONT PON transmit/receiver block 82. The downstream signal arrives at the PON receiver 127 from the photoelectric converter module 71. Here, after synchronizing and GEM extraction are performed, the signals divided into multiple transmitted short-period frames are GEM assembled in the Receive GEM assembly 126. After then storing them in the receiver GEM buffer 125, they are assigned to the ONT upstream Ethernet GEM terminator section 121 and the ONT upstream TDM GEM terminator section 123 according to table information in the ONT receive table 124. The Ethernet frames are transmitted via the ONT upstream Ethernet interface 120 to the Ethernet PHY 83. The TDM signals are extracted from (TDM) composite packets by the ONT downstream TDM GEM terminator section 123, and sent at the desired timing via the ONT upstream TDM interface 122, to the TDM PHY 84.

The upstream signals are received as TDM signals from the ONT upstream TDM interface 134, and the ONT upstream TDM GEM terminator section 133 buffers (temporarily stores) the TDM signals and assembles them into composite frames. The Ethernet frames are received from the ONT upstream Ethernet interface 136, and the ONT upstream Ethernet GEM terminator section 135 then generates the GEM. The ONT upstream Ethernet GEM terminator section 135 then periodically loads the (TDM) composite GEM from the ONT upstream TDM GEM terminator section 133 at the available timing according to instructions from the OLT transmit scheduler 131. After the transmit GEM assembly 130 generates headers via the transmit GEM buffer 132, the PON transmitter 129 transmits the GEM frames.

When ranging is requested, the ranging control unit 128 processes the ranging request signal received at the PON receiver 127, and the ONT 2 completes the ranging process by sending the ranging receive signal back via the PON transmitter 129.

Figure 12:
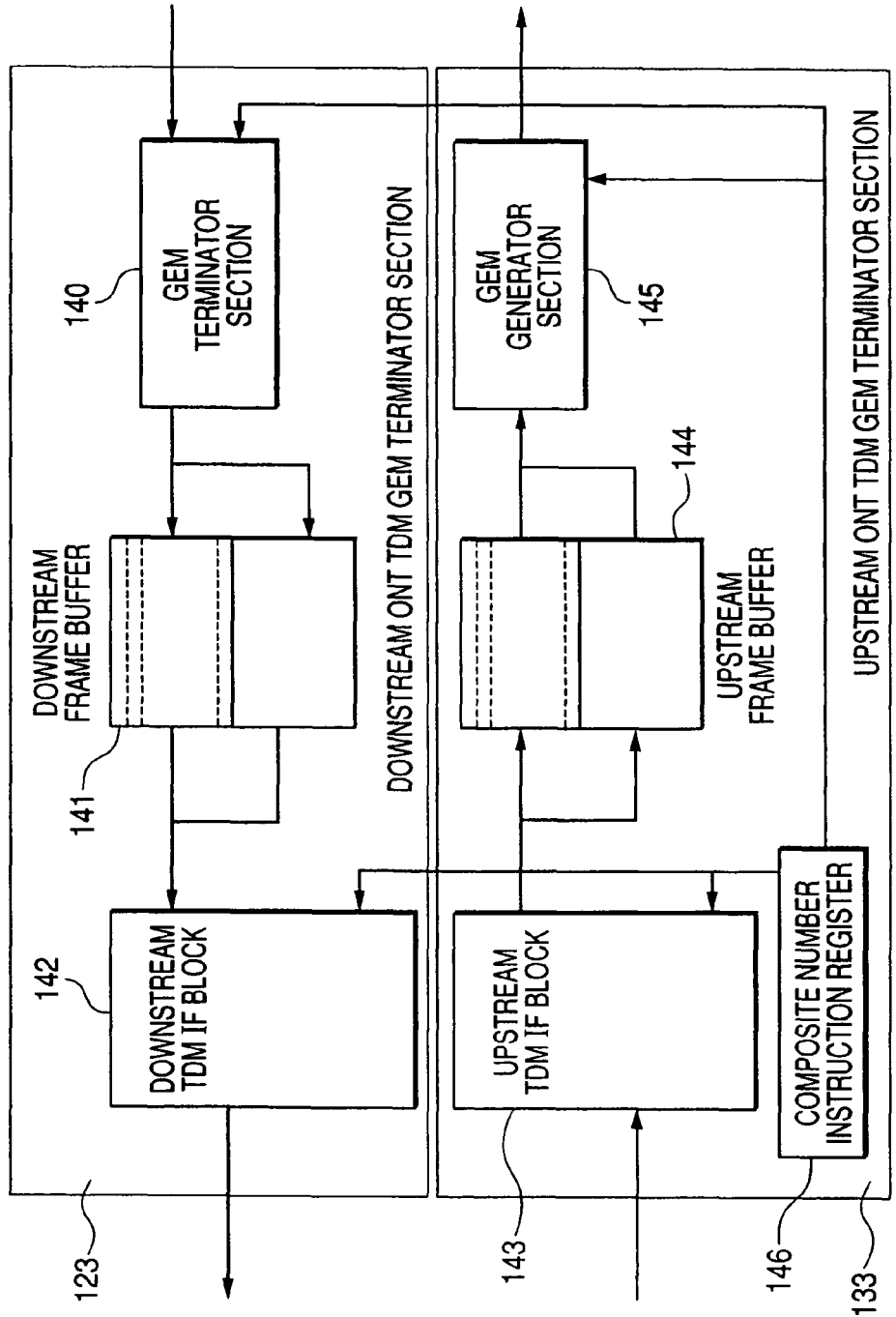
FIG. 12 is an example of the TDM GEM terminator devices for the ONT of this invention.

FIG. 12 is a block diagram showing the structure of the ONT downstream TDM GEM terminator section 123 and the ONT upstream TDM GEN terminator section 133. After the GEM terminator section 140 deletes the GEM headers of downstream receiver GEM holding the TDM signals, a payload section is written on the downstream frame buffer 141. The downstream TDM IF block 142 reads out (or loads) the TDM signals according to values in the composite number instruction register 146 and transmits them every 125 μs. These TDM signals headed upstream arrive at the upstream TDM IF block 143 every 125 μs, and those signals are then written in the upstream frame buffer 144. The storage position in the memory is at this time set according to the value in the composite number instruction register 146. The GEM generator 145 assembles the specified number of composite frames according to values in the composite number instruction register 146, attaches a GEM header and transmits the frames.

FIG. 16 is a drawing showing the method for receiving TDM frames and generating GEM frames in the ONT upstream TDM GEM terminator section 133. The mapped TDM signal received as SDH frames at the TDM PHY 84 is converted here to a signal flowing in parallel with a clock signal 181, a frame top signal 182, and a frame valid signal 183, and these signals are input to the upstream TDM IF block 143. These signals arriving every 125 μs are each written in a specified number of bytes on a specified region of the downstream frame buffer 141. When the writing ends and the GEM generator 145 finishes generating the internal headers and GEM headers, the signals are loaded (read-out) as a consecutive number of composites from the upstream frame buffer 144, and GEM frames are generated. These frames are sent to the transmit GEM buffer and transmitted to the PON domain.

FIG. 17 is a drawing showing the method for disassembling the GEM frames and generating TDM frames in the ONT downstream TDM terminator section 123. After receiving the composite GEM frames (of TDM signals), the ONT downstream TDM terminator section 123 deletes the GEM header 50 and internal header region, and consecutively writes the payload 52 for the composite frame in fields on the upstream frame buffer 141. The downstream TDM IF block 142 generates 125 μs period frames 192 at the clock 191 (32 MHz in this example), and transmits the arriving composite TDM signals respectively mapped as 194-1 through 3, every 125 μs. The frame valid signal 193 flows in parallel with the frame at this time and indicates whether the TDM signal is valid or invalid. The TDM PHY 84 receives this signal and by mapping in frames such as T1, a TDM signal is sent at this point.

What is claimed is:

1. An optical access system, comprising:
an Optical Network Terminal; and
an Optical Line Terminal connected to the Optical Network Terminal and a network,
wherein the Optical Line Terminal comprises:
a first receiving unit that receives time-division multiplexed signals from a single terminal within the network at a constant period,
a first transmitting unit that transmits each of subsets of the time-division multiplexed signals from the single terminal within the network to the Optical Network Terminal within a respective one of a plurality of first periodic frames, wherein each of the first periodic frames has a same fixed length, and
a firsts scheduler that schedules transmission of a ranging signal for measuring a distance between the Optical Line Terminal and the Optical Network Terminal such that the ranging signal is transmitted after transmission of a first subset of the time-division multiplexed signals has begun, wherein
the first transmitting unit:
transmits the ranging signal at a first fixed timing within a second periodic frame, wherein the second periodic frame is composed of a fixed number of first periodic frames, and
transmits the subsets of the time-division multiplexed signals at a second fixed timing within the second periodic frame,
wherein the transmission of the subsets of the time-division multiplexed signals is not overlapped with the transmission of the ranging signal.

2. The optical access system according to claim 1, wherein the Optical Line Terminal reads out the time-division multiplexed signals according to values in a composite number instruction register.

3. The optical access system according to claim 1, wherein a length of the second periodic frames is a multiple of a 1 millisecond constant.

4. The optical access system according to claim 1, wherein the Optical Line Terminal further comprises a frame creation unit, and
when sending signals from the Optical Line Terminal to the Optical Network Terminal,
the frame creation unit creates the first periodic frames, each of which includes x number of the time division multiplexed signals transmitted from the Optical Line Terminal to the Optical Network Terminal, and
the first transmitting unit transmits the first periodic frames to the Optical Network Terminal, and
the Optical Network Terminal comprises:
a second receiving unit that receives the first periodic frames,
a termination unit that disassembles each of the first periodic frames into the time-division multiplexed signals, and
a second transmitting unit that transmits the time-division multiplexed signal to the Optical Network Terminal.

5. The optical access system according to claim 4, wherein each first periodic frame comprises a GEM header of Generic Passive Optical Network and a consecutive x number of time-division multiplexed signals following the GEM header.

6. The optical access system according to claim 4, wherein the x is any one among 3, 4, 6, or 8.

7. The optical access system according to claim 4, wherein each first periodic frame comprises multiple structural units, and one structural unit comprises a GEM header of Generic Passive Optical Network and a consecutive x number of time-division multiplexed signals following the GEM header.

8. The optical access system according to claim 7, wherein each first periodic frame comprises a flag for notifying the Optical Network Terminal of an increase or decrease in the number of time-division multiplexed signals.

9. The optical access system according to claim 1, wherein the Optical Network Terminal includes
a first buffer that buffers the time-division multiplexed signals received at the receiving unit, and wherein
a second scheduler that schedules a first timing schedule for buffering of the time-division multiplexed signals in the first buffer and reading out of the time-division multiplexed signals from the buffer according to a length and timing of a first ranging window during which ranging signals are transmitted from the Optical Network Terminal to the Optical Line Terminal, and
a first-transmitting unit that transmits the time-division multiplexed signals read out from the buffer according to the first timing schedule and the ranging signals to the Optical Line Terminal, and
wherein the Optical Line Terminal includes
a second buffer that buffers the time-division multiplexed signals received at the first receiving unit, wherein
the first scheduler that schedules a second timing schedule for buffering of the time-division multiplexed signals in the second buffer and reading out of the time-division multiplexed signals from the second buffer according to the length and timing of a second ranging window during which the ranging signals are received from the Optical Network Terminal at the second receiving unit, and wherein the first transmitting unit that transmits the time-division multiplexed signals read out from the second buffer on the fixed cycle according to the second timing schedule.

10. The optical access system according to claim 1, wherein the Optical Line Terminal includes a first buffer that buffers the time-division multiplexed signals received at the first receiving unit, and wherein the first scheduler schedules a first timing schedule for buffering of the time-division multiplexed signals in the first buffer and reading out of the time-division multiplexed signals from the buffer according to a length and timing of a first ranging window during which ranging signals are received from the Optical Network Terminal by the first receiving unit, and the first transmitting unit transmits the time-division multiplexed signals read out from the buffer according to the first timing schedule to the Optical Network Terminal, and wherein the Optical Network Terminal includes a second receiving unit that receives the time-division multiplexed signals transmitted from the Optical Line Terminal, a second buffer that buffers the time-division multiplexed signals received at the second receiving unit, a second scheduler that schedules a second timing schedule for buffering of the time- division multiplexed signals in the second buffer and reading out of the time-division multiplexed signals from the second buffer according to the length and timing of a second ranging window during which the ranging signals are transmitted by the Optical Network Terminal to the Optical Line Terminal, and a second transmitting unit that transmits the time-division multiplexed signals read out from the second buffer on the fixed cycle according to the second timing schedule and the ranging signals to the Optical Line Terminal.

11. An Optical Line Terminal connected an Optical Network Terminal and a network, the Optical Line Terminal comprising:

a receiving unit that receives time-division multiplexed signals from a single terminal within the network at a constant period, a transmitting unit that transmits each of subsets of the time-division multiplexed signals from the single terminal within the network to the Optical Network Terminal within a respective one of a plurality of first periodic frames, wherein each of the first periodic frames has a same fixed length, and a scheduler that schedules transmission of a ranging signal for measuring a distance between the Optical Line Terminal and the Optical Network Terminal such that the ranging signal is transmitted after transmission of a first subset of the time-division multiplexed signals has begun, and wherein the transmitting unit:

transmits the ranging signal at a first fixed timing within a second periodic frame, wherein the second periodic frame is composed of a fixed number of first periodic frames, and transmits the subsets of the time-division multiplexed signals at a second fixed timing within the second periodic frames, wherein the transmission of the subset of the time-division multiplexed signals is not overlapped with the transmission of the ranging signal.

12. The Optical Line Terminal according to claim 11, wherein the Optical Line Terminal reads out the time-division multiplexed signals according to values in a composite number instruction register.

13. The Optical Line Terminal according to claim 11, wherein a length of the second periodic frames is a multiple of a 1 millisecond constant.

14. The Optical Line Terminal according to claim 11, wherein the Optical Line Terminal comprises a frame creation unit, when sending signals from the Optical Line Terminal to the Optical Network Terminal, the frame creation unit creates the first periodic frames, each of which includes x number of the time-division multiplexed signals transmitted from the single terminal, the transmitting unit transmits the first periodic frame to the Optical Network Terminal.

15. The Optical Line Terminal according to claim 14, wherein each first periodic frame comprises a GEM header of Generic Passive Optical Network and a consecutive x number of time-division multiplexed signals following the GEM header.

16. The Optical Line Terminal according to claim 14, wherein the x is any one among 3, 4, 6, or 8.

17. The Optical Line Terminal according to claim 14, wherein each first periodic frame comprises multiple structural units, and one structural unit comprises a GEM header of Generic Passive Optical Network and a consecutive x number of time-division multiplexed signals following the GEM header.

18. The Optical Line Terminal according to claim 17, wherein each first periodic frame comprises a flag for notifying the Optical Network Terminal of an increase or decrease in the number of time-division multiplexed signals in the first periodic frame.

19. The Optical Line Terminal according to claim 11, further comprising:

a buffer that buffers the time-division multiplexed signals received at the receiving unit; and wherein the scheduler that schedules a timing schedule for buffering of the time-division multiplexed signals in the buffer and reading out of the time-division multiplexed signals from the buffer according to a length and timing of a ranging window during which the ranging signals are received at the receiving unit; and the transmitting unit that transmits the time-division multiplexed signals read out from the buffer on a fixed cycle according to the timing schedule.

20. An Optical Network Terminal connected to a network via an Optical Line Terminal, the Optical Network Terminal comprising:

a receiving unit that receives time-division multiplexed signals from a single terminal within the network at a constant period, a transmitting unit that transmits each of subsets of the time-division multiplexed signals from the single terminal within the network to the Optical Line Terminal within a respective one of a plurality of first periodic frames, wherein each of the first periodic frames has a same fixed length, a scheduler that schedules transmission of a ranging signal for measuring a distance between the Optical Line Terminal and the Optical Network Terminal such that the ranging signal is transmitted after transmission of a first subset of the time-division multiplexed signals has begun, and wherein the transmitting unit:

transmits the ranging signal at a first fixed timing within a second periodic frame, wherein the second periodic frame is composed of a fixed number of first periodic frames, and transmits the subsets of the time-division multiplexed signals at a second fixed timing within the second periodic frames, wherein the timing of transmission of the subsets of the time-division multiplexed signals is not overlapped with the transmission of the ranging signal.

21. The Optical Network Terminal according to claim 20, wherein the Optical Network Terminal reads out the time-division multiplexed signals according to values in a composite number instruction register.

22. The Optical Network Terminal according to claim 20, further comprising:

a buffer that buffers the time-division multiplexed signals received at the receiving unit; and wherein the scheduler schedules a timing schedule for buffering of the time- division multiplexed signals in the buffer and reading out of the time-division multiplexed signals from the buffer according to a length and timing of a first ranging window during which ranging signals are transmitted from the Optical Network Terminal to the Optical Line Terminal; and the transmitting unit that transmits the time-division multiplexed signals read out from the buffer according to the timing schedule and the ranging signals to the Optical Line Terminal.

23. The Optical Network Terminal according to claim 20, wherein a length of the fixed timing of the second periodic frames is a multiple of a 1 millisecond constant.

24. The Optical Network Terminal according to claim 20, wherein the Optical Network Terminal comprises a frame creation unit, and when sending signals from the Optical Network Terminal to the network via the Optical Line Terminal, the frame creation unit creates the first periodic frames, each of which includes x number of the time-division multiplexed signals transmitted from the single terminal to the Optical Line Terminal, and the transmitting unit transmits the first periodic frames to the Optical Line Terminal.

25. The Optical Network Terminal according to claim 24, wherein each first periodic frame comprises a GEM header of Generic Passive Optical Network and a consecutive x number of time-division multiplexed signals following the GEM header.

26. The Optical Network Terminal according to claim 24, wherein the x is any one among 3, 4, 6, or 8.

27. The Optical Network Terminal according to claim 24, wherein each first periodic frame comprises multiple structural units, and one structural unit comprises a GEM header of Generic Passive Optical Network and a consecutive x number of time-division multiplexed signals following the GEM header.

28. The Optical Network Terminal according to claim 27, wherein each first period frame comprises a flag for notifying the Optical Line Terminal of an increase or decrease in the number of time-division multiplexed signals in the first periodic frame.

29. A method for operating an optical access system, wherein the optical access system includes an Optical Network Terminal and an Optical Line Terminal connected to the Optical Network Terminal and a network, the method comprising:

receiving, by the Optical Line Terminal, time-division multiplexed signals from a single terminal within the network at a constant period, transmitting each of subsets of the time-division multiplexed signals from the single terminal within the network to the Optical Network Terminal within a respective one of a plurality of first periodic frames, wherein each of the first periodic frames has a same fixed length, scheduling, by the Optical Line Terminal, transmission of a ranging signal for measuring a distance between the Optical Line Terminal and the Optical Network Terminal such that the ranging signal is transmitted after transmission of a first subset of the time- division multiplexed signals has begun at the Optical Line Terminal, transmitting the ranging signal at a first fixed timing within a second periodic frame from the Optical Line Terminal to the Optical Network Terminal, wherein the second periodic frame is composed of a fixed number of first periodic frames, and transmitting the subsets of the time-division multiplexed signals at a second fixed timing within the second periodic frame from the Optical Line Terminal to the Optical Network Terminal, wherein the transmission of the subsets of the time-division multiplexed signals is not overlapped with the transmission of the ranging signal.

30. A method for operating an optical access system, wherein the optical access system includes an Optical Network Terminal and an Optical Line Terminal connected to the Optical Network Terminal and a network, the method comprising:

receiving, by the Optical Network Terminal, time-division multiplexed signals from a single terminal within the network at a constant period, transmitting each of subsets of the time-division multiplexed signals from the single terminal within the network to the Optical Line Terminal within a respective one of a plurality of first periodic frames, wherein each of the first periodic frames has a same fixed length, scheduling, by the Optical Network Terminal, transmission of a ranging signal for measuring a distance between the Optical Line Terminal and the Optical Network Terminal such that the ranging signal is transmitted after transmission of a first subset of the time-division multiplexed signals has begun at the Optical Network Terminal, transmitting the ranging signal at a first fixed timing within a second periodic frame from the Optical Network Terminal to the Optical Line Terminal, wherein the second periodic frame is composed of a fixed number of first periodic frames, and transmitting the subsets of the time-division multiplexed signals at a second fixed timing within the second periodic frame from the Optical Network Terminal to the Optical Line Terminal, wherein the transmission of the subsets of the time-division multiplexed signals is not overlapped with the transmission of the ranging signal.

* * * * *